United States Patent
Yamada et al.

(10) Patent No.: US 9,730,140 B2
(45) Date of Patent: Aug. 8, 2017

(54) TRANSMISSION CONTROL METHOD, NODE, AND NON-TRANSITORY COMPUTER-READABLE RECORDING MEDIUM

(71) Applicant: FUJITSU LIMITED, Kawasaki-shi, Kanagawa (JP)

(72) Inventors: Kenji Yamada, Onojo (JP); Yuji Takahashi, Fukuoka (JP); Syunsuke Koga, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 205 days.

(21) Appl. No.: 14/278,168

(22) Filed: May 15, 2014

(65) Prior Publication Data

US 2014/0247821 A1    Sep. 4, 2014

Related U.S. Application Data

(63) Continuation of application No. PCT/JP2011/078719, filed on Dec. 12, 2011.

(51) Int. Cl.
| H04W 40/12 | (2009.01) |
| H04W 40/34 | (2009.01) |
| H04W 40/24 | (2009.01) |
| H04W 84/18 | (2009.01) |

(52) U.S. Cl.
CPC ....... *H04W 40/125* (2013.01); *H04W 40/248* (2013.01); *H04W 40/34* (2013.01); *H04W 84/18* (2013.01)

(58) Field of Classification Search
None
See application file for complete search history.

(56) References Cited

U.S. PATENT DOCUMENTS

| 6,421,354 B1 | 7/2002 | Godlewski |
| 2004/0264466 A1 | 12/2004 | Huang |
| 2005/0036486 A1 | 2/2005 | Sahinoglu et al. |
| 2008/0186984 A1 | 8/2008 | Nakano |

(Continued)

FOREIGN PATENT DOCUMENTS

| CN | 101730259 A | 6/2010 |
| JP | 2005-277566 | 10/2005 |

(Continued)

OTHER PUBLICATIONS

International Search Report, mailed in connection with PCT/JP2011/078719 and mailed Mar. 13, 2012.

(Continued)

*Primary Examiner* — Adnan Baig
(74) *Attorney, Agent, or Firm* — Fujitsu Patent Center

(57) ABSTRACT

Each of the nodes counts the number of other nodes located in a communication area of the node among nodes in a multi-hop network, and determines the number of times to retransmit a frame based on the counted number of the other nodes. Each of the nodes transmits a frame to a destination node, and repeats retransmission of the frame the determined number of times until receiving a response to the transmitted frame. Subsequently, each of the nodes changes a route to the destination node to another route when it does not receive the response after repeating the retransmissions the determined number of times.

15 Claims, 9 Drawing Sheets

(56) References Cited

U.S. PATENT DOCUMENTS

| | | |
|---|---|---|
| 2008/0205312 A1 | 8/2008 | Metke et al. |
| 2009/0284376 A1 | 11/2009 | Byun et al. |
| 2010/0037124 A1 | 2/2010 | Hoshi et al. |
| 2010/0103913 A1 | 4/2010 | Sung et al. |
| 2010/0302945 A1* | 12/2010 | Leppanen ............ H04W 40/246 370/235 |
| 2011/0038274 A1 | 2/2011 | Ikemoto et al. |
| 2011/0075578 A1* | 3/2011 | Kim ...................... H04L 45/124 370/252 |
| 2011/0141932 A1 | 6/2011 | Iwao et al. |
| 2011/0158099 A1 | 6/2011 | Fujita |
| 2011/0176416 A1 | 7/2011 | Bhatti et al. |
| 2011/0176487 A1 | 7/2011 | Zhai |
| 2012/0106344 A1 | 5/2012 | Chrysos et al. |
| 2012/0106552 A1 | 5/2012 | Iwao et al. |
| 2014/0247821 A1* | 9/2014 | Yamada .............. H04W 40/125 370/338 |

FOREIGN PATENT DOCUMENTS

| | | |
|---|---|---|
| JP | 2008-54303 A | 3/2008 |
| JP | 2008-193543 | 8/2008 |
| JP | 2009-267532 | 11/2009 |
| JP | 2010-087701 | 4/2010 |
| JP | 2010-233187 | 10/2010 |
| JP | 2010-239176 | 10/2010 |
| JP | 2011-139284 | 7/2011 |
| JP | 2012-4831 A | 1/2012 |
| WO | 2009/130918 | 10/2009 |
| WO | 2011/013165 | 2/2011 |

OTHER PUBLICATIONS

U.S. Office Action mailed Nov. 1, 2016 for Co-pending U.S. Appl. No. 14/660,659, 28 pages.
International Search Report mailed Nov. 27, 2012 for PCT/JP2012/006969 filed Oct. 31, 2012 with English, PCT/ISA/210, 3 pages.
International Written Opinion mailed Nov. 27, 2012 for PCT/JP2012/006969 filed Oct. 31, 2012, PCT/ISA/237, 3 pages.
Fukuhara, Takero et al., "Flooding Algorithm with Energy Consumption Reduction by Reducing Reception of ACK in Sensor Networks", The Transactions of the Institute of Electronics, Information and Communication Engineers (J92-B), No. 5, May 1, 2009, pp. 831-839 with partial English Translation.
Chinese Office Action dated Apr. 24, 2017 for corresponding Chinese Patent Application No. 201280076178.3, with English Translation, 18 pages.

* cited by examiner

FIG.4

| DESTI-NATION | NEIGH-BOR | WEIGHT OF ROUTE | EVALU-ATION VALUE | ORDER | TRANSMIS-SION FLAG |
|---|---|---|---|---|---|
| d | d |  | 50 | 1 | YES |
| f | f |  | 35 | 1 | YES |
| e | f | 20 | 55 | 1 | YES |
| a | d | 30 | 80 | 1 | YES |
| a | f | 50 | 85 | 2 | NO |
| ... | ... | ... | ... | ... | ... |

FIG.5

| NUMBER OF RETRANS-MISSIONS | NEIGH-BOR | OUTBOUND EVALUATION VALUE | INBOUND EVALUATION VALUE | WEIGHT OF LINK |
|---|---|---|---|---|
| xx | d | 30 | 20 | 50 |
|  | f | 25 | 10 | 35 |

FIG.6

| AD HOC HEADER | TIME | DATA HEADER | DATA PAYLOAD |
|---|---|---|---|

| GLOBAL DESTINATION ADDRESS (6 BYTES) | GLOBAL SENDER ADDRESS (6 BYTES) | FID (2 BYTES) | HTL (1BYTE) | MISCELLA-NEOUS INFORMATION (3 BYTES) |
|---|---|---|---|---|

TRANSMISSION CONTROL METHOD, NODE, AND NON-TRANSITORY COMPUTER-READABLE RECORDING MEDIUM

CROSS-REFERENCE TO RELATED APPLICATION

This application is a continuation of International Application No. PCT/JP2011/078719, filed on Dec. 12, 2011 and designating the U.S., the entire contents of which are incorporated herein by reference.

FIELD

The embodiments discussed herein are directed to a transmission control method, a node, and a transmission control program.

BACKGROUND

In recent years, a wireless sensor network has attracted attention, in which sensors are mounted on wireless communication devices and a management apparatus, such as a gateway (GW), collects pieces of measurement data from the sensors by multi-hop ad hoc communication. The wireless communication devices in the wireless sensor network need not perform network configuration, such as configuration of an Internet protocol (IP) address or a GW, and after being deployed in the network, autonomously determine a route to a final destination device.

For example, each of the wireless communication devices exchanges a control message with a neighboring device that is enabled to communicate with the subject device via a single hop, to thereby mutually recognize their existence. Furthermore, each of the wireless communication devices includes routing information stored therein into the control message to be transmitted, to thereby exchange the routing information with the neighboring device. In this manner, by exchanging the control message in the wireless sensor network, each of the wireless communication devices determines a route to a final destination device.

As a frame transmission system used in the wireless sensor network, a carrier sense multiple access (CSMA)/collision avoidance (CA) system employed in the wireless local area network (LAN) standard IEEE 802.11b is known. In the CSMA/CA system, received power strength (received signal strength indication (RSSI)) is monitored to avoid radio collision. If the RSSI is below a certain value, it is determined that other devices are not performing transmission, and after a wait for a certain time, a frame is transmitted. The wireless communication device that has transmitted the frame repeats retransmission the designated number of times until receiving an ACK from the transmission destination. Furthermore, if the wireless communication device does not receive the ACK after repeating the retransmission the designated number of times, the wireless communication device changes the transmission route to another route and transmits the frame through the changed route.

Patent document 1: Japanese Laid-open Patent Publication No. 2009-267532
Patent document 2: Japanese Laid-open Patent Publication No. 2010-233187
Patent document 3: International Publication Pamphlet No. WO 2011/013165

Incidentally, in the conventional technology, it is possible to improve the frame reachability by increasing the number of retransmissions. In contrast, the occupancy of the radio band increases by the increase in the number of retransmissions. Namely, improving the frame reachability by the increased number of retransmissions and ensuring the radio band are in a trade-off relationship, and can hardly be realized at the same time.

For example, in the conventional technology, even when a primary route is switched to a redundant route due to a failure in transmission of a frame, it may be possible that the redundant route is an unstable route with weaker signal strength than that of the primary route and retransmission may be repeated the maximum number of times. In contrast, in some cases, the signal strength does not differ between the primary route and the redundant route. In this case, it may be possible to improve the frame reachability by switching the route.

Incidentally, the OSI reference model is known as a model that divides a communication function of a communication apparatus into layers. In the OSI reference model, an ideal communication system is such a system that causes each of the layers to perform a process, such as parameter operation or function-call operation, without influencing the other layers, that is, that reduces the dependency.

In the conventional technology, routing control for selecting and switching a route to a destination is performed by the third layer, and retransmission control for transmitting and retransmitting a frame is performed by the second layer. Therefore, the retransmission control and the routing control are independent of each other and is not performed in an associated manner. Therefore, the frame reachability is improved by increasing the number of retransmissions, but in contrast, the radio band is occupied due to the increased number of retransmission processes.

SUMMARY

According to an aspect of the embodiment, a transmission control method is executed by a node in an ad hoc network. A transmission control method includes counting number of other nodes located in a communication area of the node among nodes in the ad hoc network; determining number of times to retransmit a frame based on the counted number of the other nodes; transmitting the frame to a destination node; repeating retransmission of the frame the determined number of times until a response to the transmitted frame is received; and changing a route to the destination node to another route when the response is not received after repeating the retransmissions the determined number of times.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of routing information stored in a routing table;

FIG. 5 is a diagram illustrating an example of link information stored in a link management table;

FIG. 6 is a diagram illustrating an example of a data frame;

DESCRIPTION OF EMBODIMENTS

Preferred embodiments will be explained with reference to accompanying drawings. The present invention is not limited by the embodiments below.

[a] First Embodiment

Overall Configuration

Figure 1:
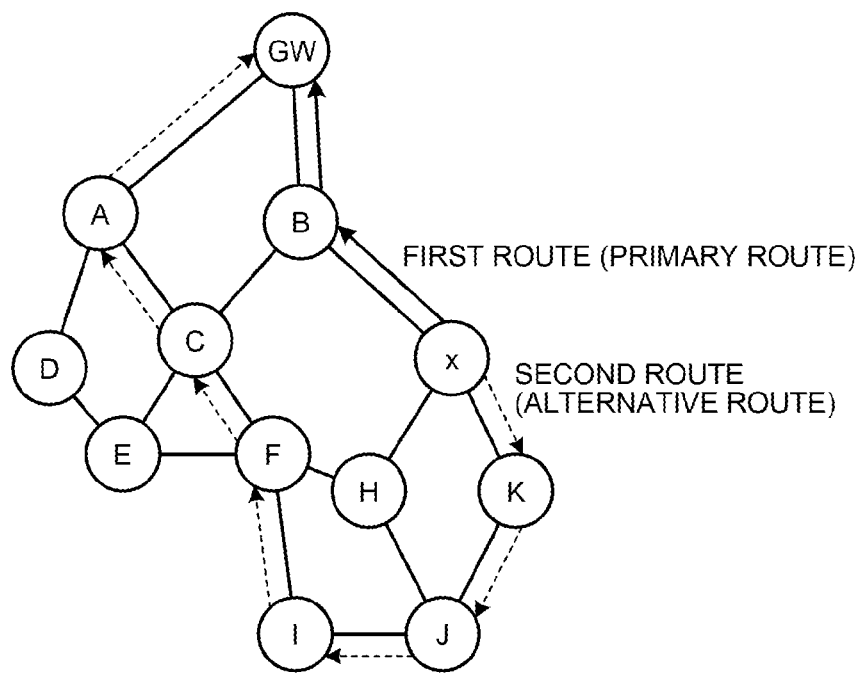
FIG. 1 is a diagram illustrating an ad hoc network according to a first embodiment.

FIG. 1 is a diagram illustrating an ad hoc network according to a first embodiment. As illustrated in FIG. 1, the ad hoc network is a multi-hop network including a gateway (GW) and multiple nodes such that one or more nodes are on the path from a source node to a destination node. Furthermore, the ad hoc network illustrated in FIG. 1 is a network in which each of the nodes automatically determines routing information. The node is an example of a wireless communication device, includes an internal sensor or an external sensor, and transmits a sensed value (hereinafter, referred to as a sensor value) to a GW device. The GW is an example of a wireless communication device connected to a management apparatus that collects the sensor values from all of the nodes. Examples of the sensor value include temperature, humidity, and acceleration.

All of the nodes exchange pieces of routing information with one another according to a route search protocol. In this case, each of the nodes uses a control frame called a HELLO frame. Each of the nodes stores therein, for example, pieces of information on redundant routes to the GW serving as a destination node.

For example, a node x stores therein a route, as a primary route, to transmit a frame to the GW via a node B. The node x also stores therein a route, as an alternative route, to pass through a node K, a node J, a node I, a node F, a node C, and a node A in this order. Namely, when transmitting a frame to the GW, the node x transmits the frame by using the primary route. If communication using the primary route is disabled due to a failure or the like in the primary route, the node x switches from the primary route to the alternative route and transmits the frame through the alternative route.

Extraction of Network

Figure 2:
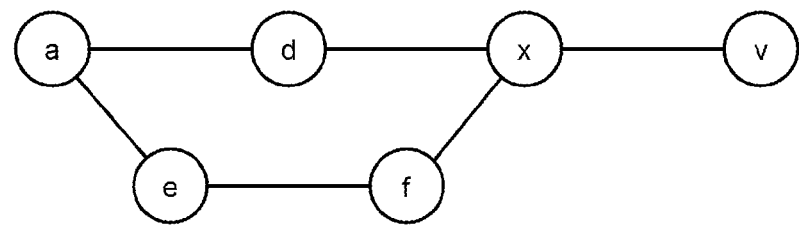
FIG. 2 is a diagram illustrating an extracted part of the ad hoc network.

The embodiments below will be explained with reference to FIG. 2 in which an ad hoc network is simplified for convenience of explanation. FIG. 2 is a diagram illustrating an extracted part of the ad hoc network. As illustrated in FIG. 2, in the first embodiment, an ad hoc network including a node a, a node d, a node e, a node f, a node x, and a node v will be described as an example.

Each of the nodes illustrated in FIG. 2 periodically transmits a HELLO frame containing routing information stored in the node. Specifically, the HELLO frame transmitted by the node a is received by the node d and the node e that are enabled to directly communicate with the node a. Similarly, the HELLO frame transmitted by the node d is received by each of the neighboring nodes enabled to directly communicate with the node d. The HELLO frame transmitted by the node e is received by each of the neighboring nodes enabled to directly communicate with the node e. The HELLO frame transmitted by the node f is received by each of the neighboring nodes enabled to directly communicate with the node f. The HELLO frame transmitted by the node x is received by each of the neighboring nodes enabled to directly communicate with the node x. The HELLO frame transmitted by the node v is received by each of the neighboring nodes enabled to directly communicate with the node v.

As described above, all of the nodes can mutually confirm the existence of the nodes, confirm dead or alive of the nodes, and exchange the pieces of the routing information by exchanging the HELLO frames with the neighboring nodes. Furthermore, each of the nodes stores therein an evaluation value of each piece of the routing information based on signal strength at the time of receiving the HELLO frame or based on priority designated by each of the nodes. If multiple pieces of the routing information on the same destination are present, each of the nodes preferentially uses a piece of the routing information with a higher evaluation value.

Each of the nodes as described above calculates the number of other nodes located in a communication range of the node from among the nodes included in the ad hoc network, and determines the number of times to retransmit a frame based on the calculated number of the other nodes. Subsequently, each of the nodes transmits the frame to a destination node and repeats retransmissions of the frame the determined number of times until receiving a response to the transmitted frame. If each of the nodes does not receive the response after repeating the retransmissions of the frame the determined number of times, it changes the route to another route to the destination node.

For example, when the nodes are densely deployed, each of the nodes reduces the number of retransmissions to switch the route. In contrast, when the nodes are not densely deployed, each of the nodes increases the number of retransmissions to prevent switching of the route.

As described above, by controlling the number of retransmissions depending on whether the nodes are densely deployed or not, it becomes possible to control the processes performed by the second layer and the third layer of the OSI reference model in an associated manner. Therefore, each of the nodes can prevent occupation of the band due to the increased number of retransmissions, and at the same time, can prevent a decrease in the frame reachability due to the decreased number of retransmissions. As a result, each of the nodes can ensure the band and stabilize the route at the same time.

Configuration of Node

Figure 3:
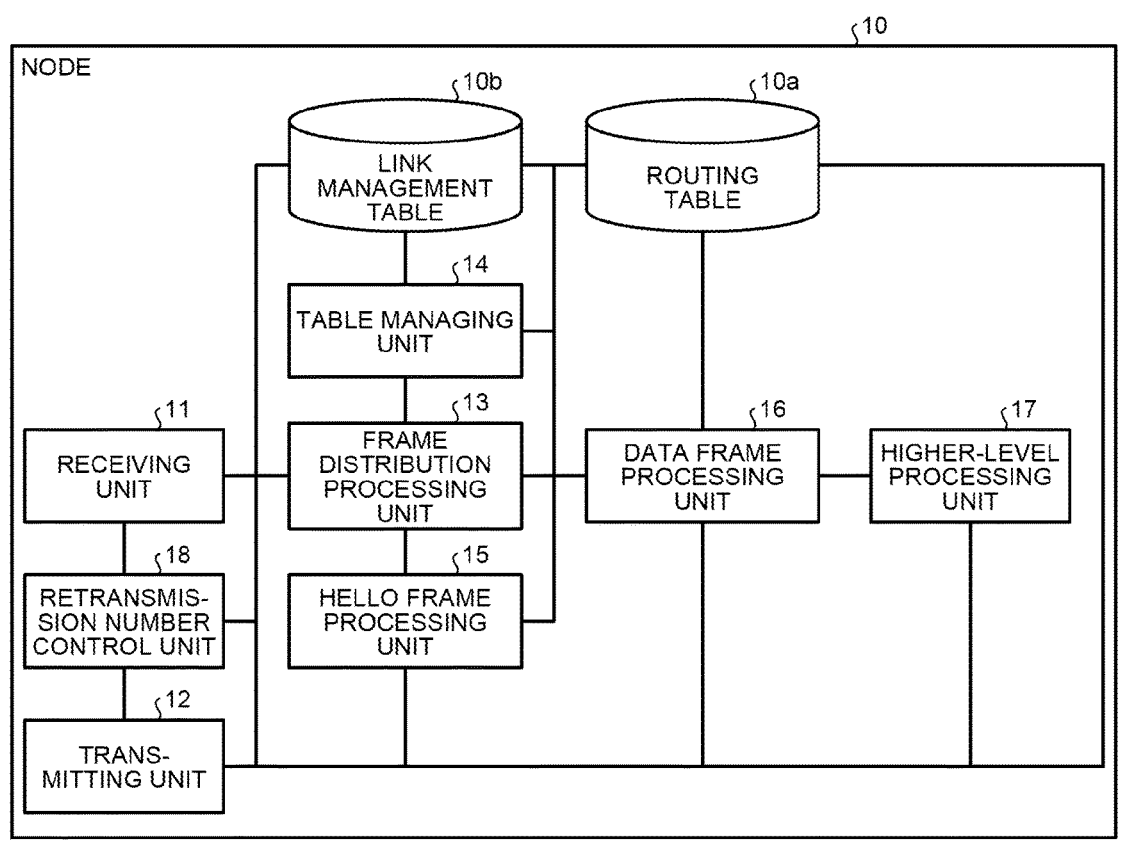
FIG. 3 is a functional block diagram of a node according to the first embodiment.

Next, a functional block diagram of the nodes will be explained. All of the nodes illustrated in FIG. 2 have the same configurations, and therefore will be explained as a node 10 below. FIG. 3 is a functional block diagram of the node according to the first embodiment.

As illustrated in FIG. 3, the node 10 includes a routing table 10a and a link management table 10b. The node 10 further includes a receiving unit 11, a transmitting unit 12, a frame distribution processing unit 13, a table managing unit 14, a HELLO frame processing unit 15, a data frame processing unit 16, a higher-level processing unit 17, and a retransmission number control unit 18. Incidentally, the routing table 10a and the link management table 10b are provided in a storage device, such as a semiconductor device or a hard disk. Furthermore, the receiving unit 11, the transmitting unit 12, and the retransmission number control unit 18 are implemented by a wireless module or the like. Moreover, the frame distribution processing unit 13, the table managing unit 14, the HELLO frame processing unit 15, the data frame processing unit 16, and the higher-level processing unit 17 are implemented by a processor, such as a micro-processing unit (MPU).

The routing table 10a stores, as illustrated in FIG. 4, pieces of routing information. FIG. 4 is a diagram illustrating an example of the pieces of the routing information stored in the routing table. In FIG. 4, the routing table of the node x is illustrated.

As illustrated in FIG. 4, the routing table 10a stores "destination, neighbor, weight of route, evaluation value, order, transmission flag" in an associated manner. The "destination" contained in the table is information indicating a node serving as a destination of a frame, and the "neighbor" is information indicating a node mutually connected to a subject node among nodes through which the frame is relayed. The "weight of route" is information indicating the quality of a route between the destination node and the neighboring node, and the "evaluation value" is information indicating the quality of a route from the subject node to the destination node. The "order" is information indicating priority of the routing information, and the "transmission flag" is information indicating whether the routing information is transmitted to the neighboring node by using a HELLO frame or the like.

In the example in FIG. 4, the routing table 10a stores a piece of routing information containing "d" as the destination node, "d" as the neighboring node, and "50" as the evaluation value. Specifically, the routing table 10a stores information indicating that when a packet is to be transmitted to the node "d" as a destination, there is a route to transmit the packet to the neighboring node "d" and the quality of the route corresponds to the evaluation value of "50". Furthermore, the routing table 10a stores a piece of routing information containing "e" as the destination node, "f" as the neighboring node, and "55" as the evaluation value. Specifically, the routing table 10a stores information indicating that when a packet is to be transmitted to the node "e" as a destination, there is a route to transmit the packet to the neighboring node "f" and the quality of the route corresponds to the evaluation value of "55".

Referring back to FIG. 3, the link management table 10b stores pieces of link information. The link information indicates an evaluation value of the quality of a link between a subject node and a neighboring node. FIG. 5 is a diagram illustrating an example of the pieces of the link information stored in the link management table.

As illustrated in FIG. 5, the link management table 10b stores "neighbor, outbound evaluation value, inbound evaluation value, weight of link" in an associated manner. The "neighbor" contained in the table is information indicating a neighboring node, the "outbound evaluation value" is information indicating the quality of an outbound route, the "inbound evaluation value" is information indicating the quality of an inbound route, and the "weight of link" is information indicating the quality of a link between a neighboring node and a subject node.

Specifically, the link management table 10b stores a piece of link information containing "d" as the neighboring node, "30" as the outbound evaluation value, "20" as the inbound evaluation value, and "50" as the weight of link. More specifically, the link management table 10b stores information indicating that the quality of the outbound route to the neighboring node "d" corresponds to the outbound evaluation value of "30" and the quality of the inbound route from the neighboring node "d" corresponds to the inbound evaluation value of "20". Furthermore, the link management table 10b stores information indicating that a link to the neighboring node "d" corresponds to the weight of link of "50".

The concepts of the outbound evaluation value, the inbound evaluation value, and the weight of link will be explained below. Each of the nodes 10 of the first embodiment evaluates the quality of a link to a neighboring node and stores the latest information in the link management table 10b every time the node transmits and receives a HELLO frame to and from the neighboring node.

For example, the node x exchanges a HELLO frame with the node d and stores the signal strength of "30 (dBm)" at the time of receiving the HELLO frame from the node d, as the outbound evaluation value for the node d, in the link management table 10b. Namely, the node x stores, as the outbound evaluation value, the signal strength of the link to the node d in the link management table 10b. Similarly, the node x receives the signal strength of "20 (dBm)" from the node d when the node d receives the HELLO frame transmitted by the node x, and stores the signal strength of "20 (dBm)", as the inbound evaluation value for the node d, in the link management table 10b. Furthermore, the node x stores a sum of the outbound evaluation value and the inbound evaluation value for the node d, as the weight of link, in the link management table 10b.

Next, the information in the routing table 10a will be explained. The weight of route stored in the routing table 10a is information indicating the quality of a route between a destination node and a neighboring node. For example, in the case of a route from the node x to the node a via the node e, the weight of route from the node x to the node e and the weight of route from the node e to the node a are added up. Furthermore, the evaluation value stored in the routing table 10a is a value obtained by adding the weight of route and the weight of link contained in the link management table 10b. Incidentally, the signal strength or the like may be used as the weight of route or the weight of link. Alternatively, as another information, stability determined by an administrator or the like may be used.

The information stored in the routing table 10a and the link management table 10b is described by way of example only and is not limited to those illustrated in the drawings. An administrator or the like may arbitrarily change settings. For example, it may be possible to use only the weight of link without using the weight of route, use only one of the outbound evaluation value and the inbound evaluation value, or use an average of the outbound evaluation value and the inbound evaluation value as the weight of link. Furthermore, an example is explained in which the signal strength is used as the outbound evaluation value and the inbound evaluation value; however, it is not limited thereto. For example, it may be possible to use the reception rate of a HELLO frame when the HELLO frame is transmitted and received a predetermined number of times. Furthermore, it may be possible to use a value calculated by assigning the signal strength to a predetermined evaluation function or the like.

Referring back to FIG. 3, the receiving unit 11 is a processing unit that receives a HELLO frame or a data frame. For example, when receiving a HELLO frame from a neighboring node in the ad hoc network, the receiving unit 11 outputs the received HELLO frame to the frame distribution processing unit 13. Furthermore, when receiving a data frame from a neighboring node in the ad hoc network, the receiving unit 11 outputs the received data frame to the frame distribution processing unit 13. Moreover, when receiving a response to the transmitted frame from the neighboring node, the receiving unit 11 outputs the response to the frame distribution processing unit 13 and the retransmission number control unit 18.

The transmitting unit 12 is a processing unit that transmits a HELLO frame or a data frame to a destination in accordance with an instruction from the HELLO frame processing unit 15 or the data frame processing unit 16. For example, when a HELLO frame is input by the HELLO frame processing unit 15, the transmitting unit 12 transmits the HELLO frame by broadcast. Similarly, when a data frame is input by the data frame processing unit 16, the transmitting unit 12 transmits the data frame to a destination node by broadcast. Incidentally, the transmitting unit 12 stores therein, for example, five as the number of retransmissions corresponding to the density calculated by using the link management table 10b.

Furthermore, when a frame received from another node is expected to be transferred, the transmitting unit 12 transfers the received frame to a destination. For example, when a global destination address indicating a final destination of the received frame does not correspond to the own node, the transmitting unit 12 transfers the received frame by broadcast. At this time, the transmitting unit 12 may transmit the received frame when a local destination address indicating a node that is requested to transfer the received frame corresponds to the own node. In this case, the transmitting unit 12 transfers the received frame after overwriting the local destination address with address information on a neighboring node located on a path to the destination.

Figure 7:
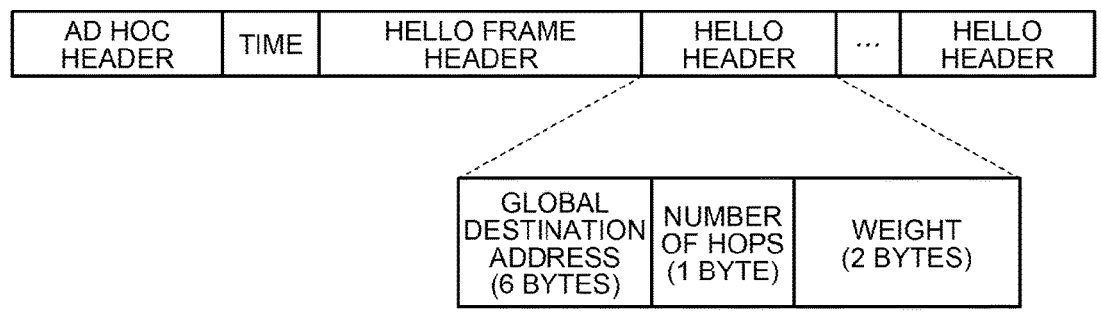
FIG. 7 is a diagram illustrating an example of a HELLO frame.

Examples of the data frame and the HELLO frame will be explained below with reference to FIG. 6 and FIG. 7. FIG. 6 is a diagram illustrating an example of the data frame, and FIG. 7 is a diagram illustrating an example of the HELLO frame. The data frame is generated by the data frame processing unit 16, and the HELLO frame is generated by the HELLO frame processing unit 15.

As illustrated in FIG. 6, the data frame contains an ad hoc header, time, a data header, and a data payload. The ad hoc header is information for identifying a frame transmitted and received in the ad hoc network, and the time indicates the time of transmission. The data header contains a global destination address, a global sender address, an FID, an HTL, and miscellaneous information, and thus indicates details of the data frame. The global destination address is information of 6 bytes indicating a node serving as a final destination of the data frame, and the global sender address is information of 6 bytes indicating a node that has generated the data frame. The FID is information of 2 bytes indicating an identifier for identifying the frame, and the HTL is information of 1 byte indicating an expiration date of the data frame. The miscellaneous information is information of 3 bytes in which arbitrary information can be stored by an administrator or the like. Furthermore, the data payload stores data to be transmitted.

Next, as illustrated in FIG. 7, the HELLO frame contains an ad hoc header, time, a HELLO frame header, and HELLO headers. The ad hoc header is information for identifying a frame transmitted and received in the ad hoc network, the time indicates the time of transmission. The HELLO frame header indicates information on a neighboring node of a node serving as a transmission source. Each of the HELLO headers contains a global destination address, the number of hops, and weight, and thus indicates routing information. The global destination address is information of 6 bytes indicating a node serving as a final destination of the data frame. The number of hops is information of 1 byte indicating the number of hops to the final destination. The weight is information of 2 bytes indicating the quality of a route to the final destination.

Referring back to FIG. 3, the frame distribution processing unit 13 is a processing unit that distributes a frame received by the receiving unit 11 to a corresponding processing unit. For example, when the receiving unit 11 receives a frame, and if the frame contains the data header, the frame distribution processing unit 13 outputs the received frame to the data frame processing unit 16. Furthermore, when the receiving unit 11 receives a frame, and if the frame contains the HELLO frame header, the frame distribution processing unit 13 outputs the received frame to the table managing unit 14 or the like.

The table managing unit 14 is a processing unit that updates information stored in the link management table 10b or the information stored in the routing table 10a when receiving a HELLO frame from another node. For example, in the example in which the signal strength is used as the evaluation value, when a HELLO frame is received, the table managing unit 14 acquires information on a neighboring node of a transmission source and acquires signal strength at the time of receiving the HELLO frame. Subsequently, the table managing unit 14 updates the outbound evaluation value stored in the link management table 10b in association with the acquired neighboring node with the signal strength acquired from the HELLO frame, and updates the weight of link. Furthermore, when the weight of link in the link management table 10b is updated, the table managing unit 14 updates the evaluation value or the like in the routing table 10a. Incidentally, if the evaluation value is other than the signal strength, the table managing unit 14 may update information stored in the link management table 10b with the evaluation value contained in the received HELLO frame.

Referring back to FIG. 3, the HELLO frame processing unit 15 is a processing unit that periodically generates and transmits a HELLO frame. Specifically, the HELLO frame processing unit 15 generates a HELLO frame by storing the pieces of the routing information stored in the routing table 10a in the respective HELLO headers for each clock event that occurs at predetermined intervals, and transmits the HELLO frame by broadcast. For example, the HELLO frame processing unit 15 generates a HELLO frame by storing a neighboring node in the global destination address and storing the pieces of the routing information in the respective HELLO headers of the HELLO frame, for each of the neighboring nodes stored in the link management table 10b. Subsequently, the HELLO frame processing unit 15 transmits the generated HELLO frame by broadcast. At the time of transmission, the HELLO frame processing unit 15 stores the time of the transmission in the time in the HELLO frame.

Furthermore, the HELLO frame processing unit 15 periodically receives a HELLO frame from the neighboring node. If information on the node serving as the transmission source of the received HELLO frame is not stored in the link management table 10b, the HELLO frame processing unit 15 updates the link management table 10b and the routing table 10a. Specifically, when a new neighboring node is detected, the HELLO frame processing unit 15 generates a record corresponding to the new node in the link management table 10b and the routing table 10a. Furthermore, if the global destination address of the received HELLO frame is not stored in the routing table 10a, the HELLO frame processing unit 15 generates a new record in the routing table 10a. Incidentally, the process for generating the new record or the like may be performed by the table managing unit 14.

The data frame processing unit 16 is a processing unit that generates a data frame and transmits the data frame to a destination according to an instruction from the higher-level processing unit 17, and outputs data frames received from other nodes to the higher-level processing unit 17. For example, the data frame processing unit 16 receives input of a destination and transmission target data from the higher-level processing unit 17. Subsequently, the data frame processing unit 16 stores address information or the like on the input destination in the global destination address, and stores address information or the like on the own node in the global sender address. Furthermore, the data frame processing unit 16 stores values designated by the higher-level processing unit 17 or an administrator in the FID and the HTL, and stores the input data in the data payload, to thereby generate a data frame. Subsequently, the data frame processing unit 16 refers to the routing table 10a by using the input destination as a key and specifies neighboring nodes associated with the destination. Then, the data frame processing unit 16 transmits the generated data frame to a neighboring node having the highest priority among the specified neighboring nodes. At the time of transmission, the data frame processing unit 16 stores the time of the transmission in the time in the data frame.

Furthermore, when receiving a data frame from another node, the data frame processing unit 16 refers to the time and the HTL in the data frame. If the expiration date has passed, the data frame processing unit 16 outputs an error to the higher-level processing unit 17. In contrast, if the expiration date has not passed, the data frame processing unit 16 outputs the received data frame to the higher-level processing unit 17.

The higher-level processing unit 17 is a processing unit that executes an application or the like. For example, the higher-level processing unit 17 inputs transmission target data and a transmission destination to the data frame processing unit 16 and gives an instruction to transmit the data. Furthermore, the higher-level processing unit 17 outputs the received data frame input by the data frame processing unit 16 to the application.

The retransmission number control unit 18 is a processing unit that counts the number of nodes that can communicate with the own node among the nodes in the multi-hop network, and determines the number of times to retransmit a frame based on the counted number of the nodes. For example, the retransmission number control unit 18 periodically refers to the link management table 10b. Subsequently, the retransmission number control unit 18 extracts the weight of link associated with the "neighbor" in order from the first record in the link management table 10b, and determines whether the weight of link is equal to or greater than a threshold. Then, the retransmission number control unit 18 counts the number of the "neighbor"s for which the weight of link is equal to or greater than the threshold. Subsequently, if the counted number of the "neighbor"s is equal to or greater than the threshold, the retransmission number control unit 18 determines that the nodes are densely deployed, and notifies the transmitting unit 12 of a value obtained by subtracting a predetermined value from the initial value of the number of retransmissions. In contrast, if the counted number of the "neighbor"s is smaller than the threshold, the retransmission number control unit 18 determines that the nodes are sparsely deployed, and notifies the transmitting unit 12 of a value obtained by adding a predetermined value to the initial value of the number of retransmissions.

While an exemplary method to determine the number of retransmissions will be described later, the retransmission number control unit 18 may determine the number of retransmissions based on, for example, a difference between the number of the "neighbor"s and the threshold. For example, the retransmission number control unit 18 may employ "(counted number/threshold)×initial value" as the number of retransmissions. Furthermore, it may be possible to associate a bit error rate (BER) and the received signal strength (evaluation value), which will be described later.

The retransmission number control unit 18 monitors the receiving unit 11 and the transmitting unit 12 and outputs, to the transmitting unit 12, an instruction to repeat retransmissions until a response to the transmitted frame is received. If the response is not received by the repetition of retransmissions, the retransmission number control unit 18 outputs, to the transmitting unit 12, an instruction to changes the route to the destination node to another route.

For example, the retransmission number control unit 18 monitors the transmitting unit 12, and when detecting that a data frame is transmitted to a neighboring node, acquires the number of retransmissions from the transmitting unit 12 or the like. Then, the retransmission number control unit 18 monitors the receiving unit 11 to determine whether an ACK for the transmitted data frame is received within a predetermined time. Incidentally, the transmitted data frame and the ACK may be associated with each other by using various known technologies. For example, it may be possible to determine the association based on whether identifiers, such as FIDs, contained in the headers are identical to each other.

If the ACK is not received within the predetermined time, the retransmission number control unit 18 instructs the transmitting unit 12 to retransmit the data frame. The retransmission number control unit 18 repeats the above-described retransmission process the number of times stored in the link management table 10b until the ACK is received. If the ACK is not received even by repeating the retransmission process the determined number of times, the retransmission number control unit 18 instructs the transmitting unit 12 to change the route and transmit the data frame through the changed route. Upon receiving the instruction to change the route, the transmitting unit 12 selects a route having the second highest priority by referring to the routing table 10a, and retransmits the data frame. Thereafter, the retransmission number control unit 18 repeats the same processes as the processes as described above.

Flow of Processes

The flow of processes performed by the node according to the first embodiment will be explained below with reference to FIG. 8 to FIG. 10. Specifically, a HELLO frame transmission process, a retransmission number determination process, and a data frame transmission process will be described below.

HELLO Frame Transmission Process

Figure 8:
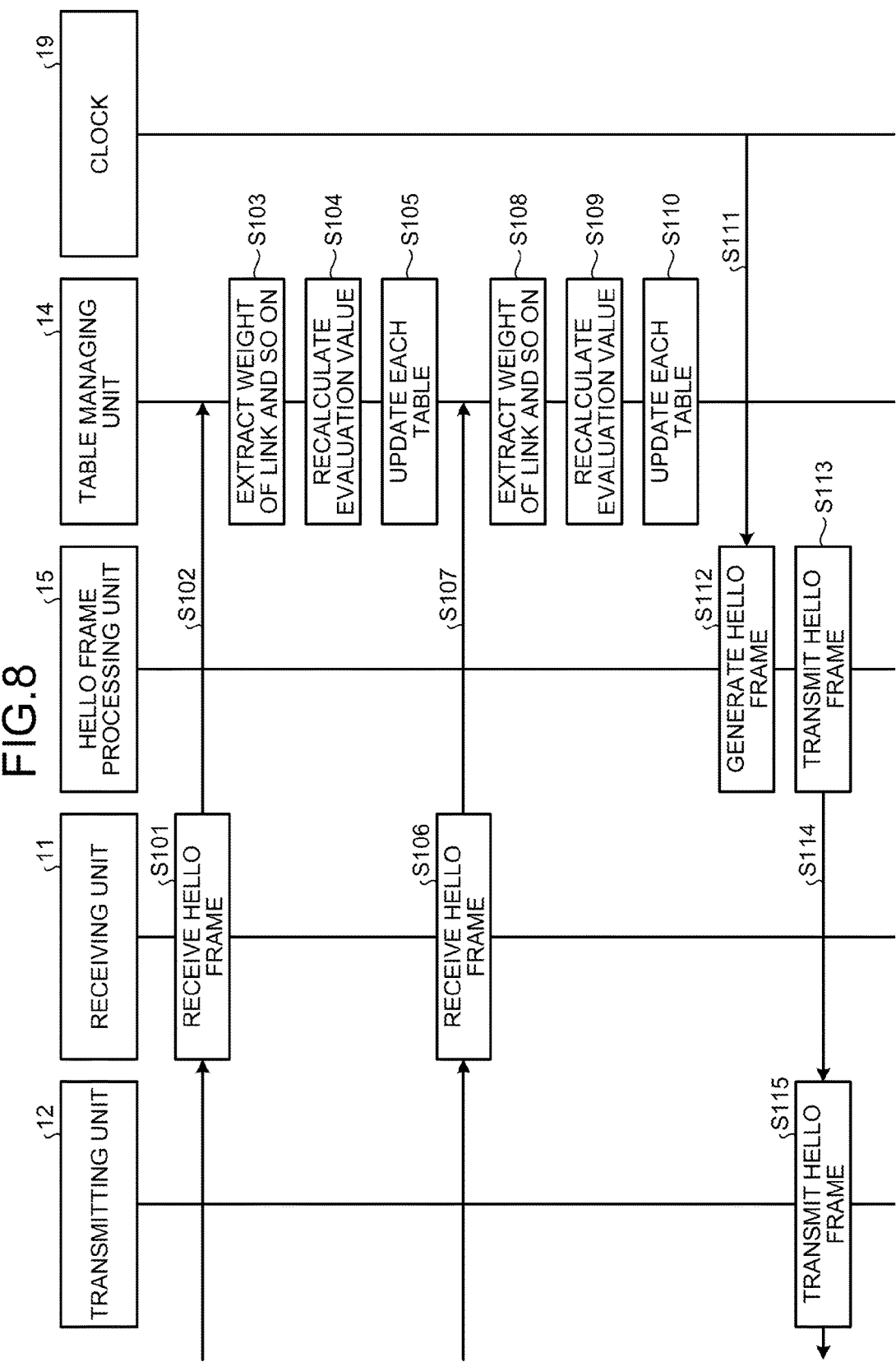
FIG. 8 is a sequence diagram illustrating the flow of a HELLO frame transmission process.

FIG. 8 is a sequence diagram illustrating the flow of the HELLO frame transmission process. As illustrated in FIG. 8, the receiving unit 11 of the node 10 receives a HELLO frame from a neighboring node located in an area in which communication with the node 10 is enabled (S101).

The table managing unit 14 of the node 10 extracts the weight of link, the routing information, or the like for each of the global destination addresses contained in the HELLO headers of the received HELLO frame (S102 and 103). Subsequently, the table managing unit 14 recalculates the evaluation value or the like for each of the global destination addresses (S104), and updates the link management table 10b and the routing table 10a by using information extracted from the HELLO frame, the generated evaluation value, or the like (S105).

Subsequently, the receiving unit 11 of the node 10 receives a HELLO frame from another neighboring node located in the area in which communication with the node 10 is enabled (S106). Then, the table managing unit 14 performs the same process as the process from S102 to S105, and updates the link management table 10b and the routing table 10a based on the HELLO frame received at S106 (S107 to S110).

Meanwhile, the node 10 includes a clock 19 that measures a predetermined cycle. When being notified of a trigger by the clock 19 (S111), the HELLO frame processing unit 15 generates a HELLO frame by using the routing information stored in the routing table 10a (S112). Then, the HELLO frame processing unit 15 instructs the transmitting unit 12 to transmit the generated HELLO frame to a neighboring node stored in the link management table 10b or the like (S113 and S114). The transmitting unit 12 transmits the designated HELLO frame to the designated neighboring node by broadcast (S115).

Retransmission Number Determination Process

Figure 9:
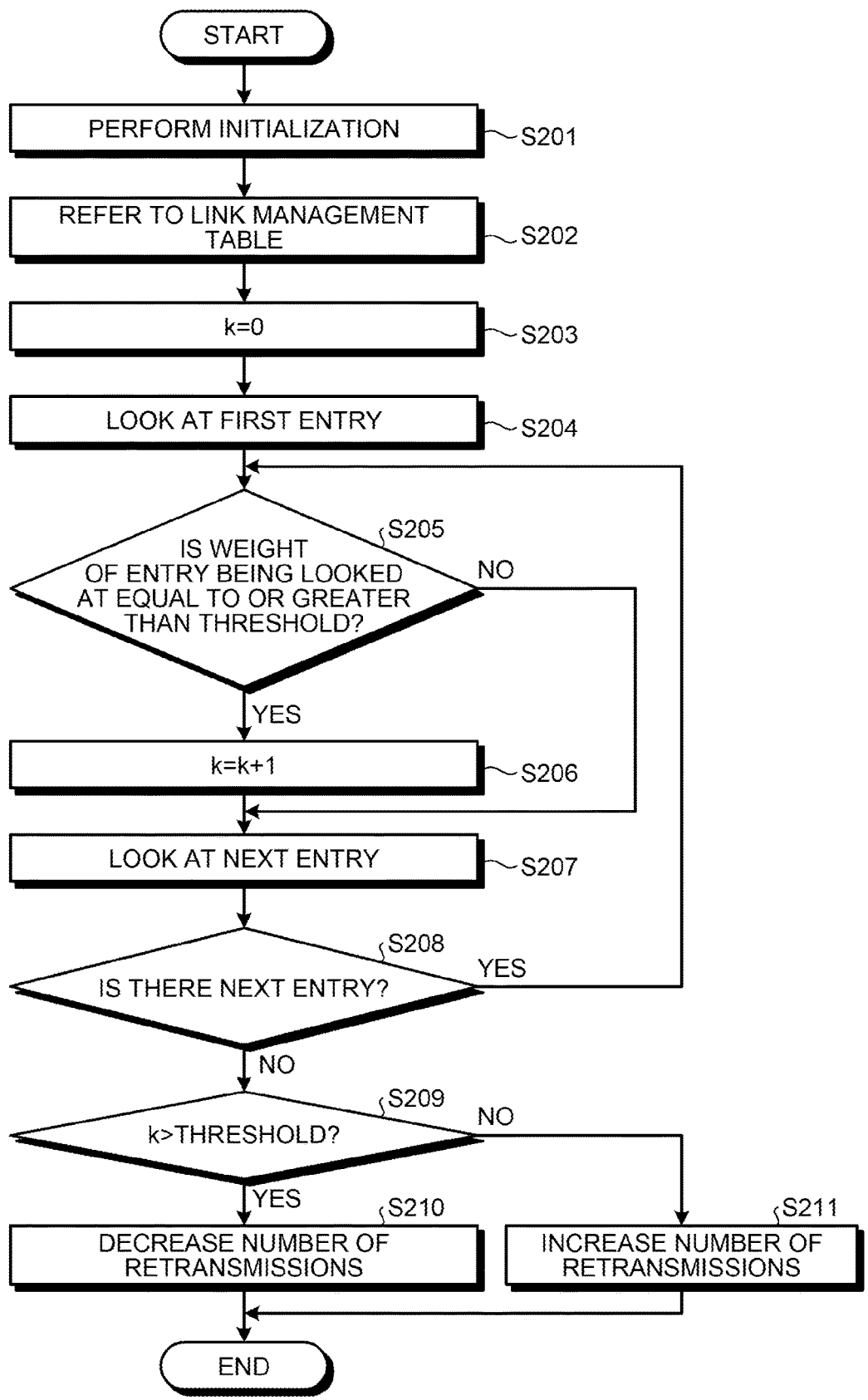
FIG. 9 is a flowchart illustrating the flow of a retransmission number determination process.

FIG. 9 is a flowchart illustrating the flow of the retransmission number determination process. As illustrated in FIG. 9, the retransmission number control unit 18 of the node 10 initializes the contents of a processor or a memory when power is turned on or reset, and sets a threshold for determining the density of the neighboring nodes and the number of retransmissions to initial values (S201). For example, the retransmission number control unit 18 may calculate the initial values to be set based on initial values of a hardware setting file or firmware, or may set predetermined initial values.

Subsequently, the retransmission number control unit 18 refers to the link management table 10b (S202), assigns zero to the variable k (S203), and looks at the first entry of the link management table 10b (S204).

Then, the retransmission number control unit 18 determines whether the weight of link in the entry being looked at is equal to or greater than the threshold (S205). If the weight of link is equal to or greater than the threshold (YES at S205), the retransmission number control unit 18 increments the variable k (S206), and looks at a next entry in the link management table 10b (S207). In contrast, if the weight of link is smaller than the threshold (NO at S205), the retransmission number control unit 18 performs a process at S207 without updating the variable k.

Subsequently, if there is a next entry (YES at S208), the retransmission number control unit 18 repeats the process from S205. In contrast, if there is no next entry (NO at S208), the retransmission number control unit 18 determines whether the value of the variable k calculated by this time is greater than a threshold (S209).

Then, when determining that the value of the variable k is greater than the threshold (YES at S209), that is, when determining that the number of the nodes is dense, the retransmission number control unit 18 notifies the transmitting unit 12 or the like of a value, as the number of retransmissions, obtained by subtracting a predetermined value from the initial value (S210).

In contrast, when determining that the value of the variable k is smaller than the threshold (NO at S209), that is, when determining that the number of the nodes is sparse, the retransmission number control unit 18 notifies the transmitting unit 12 of a value, as the number of retransmissions, obtained by adding a predetermined value to the initial value (S211).

Data Frame Transmission Process

Figure 10:
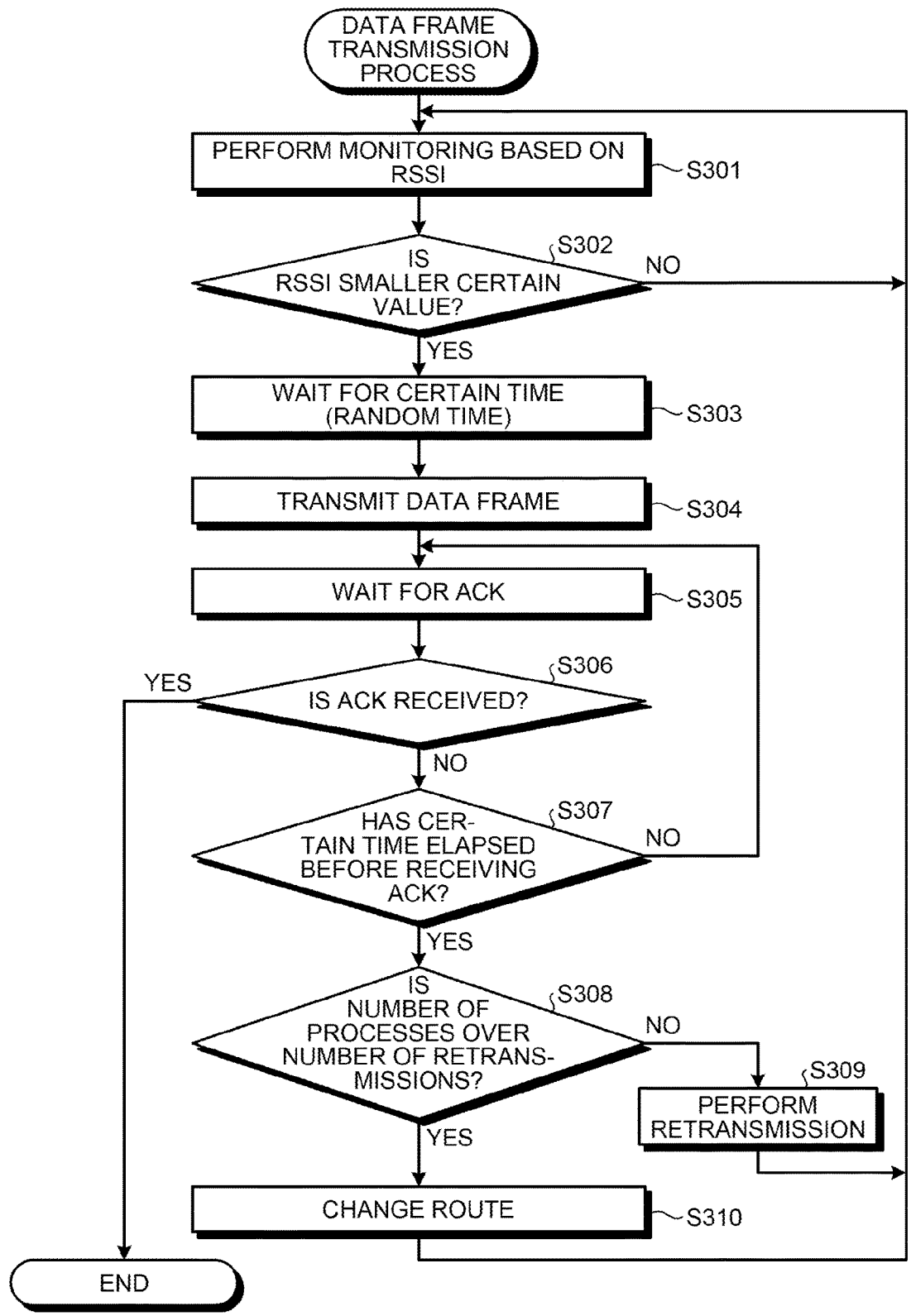
FIG. 10 is a flowchart illustrating the flow of a data frame transmission process.

FIG. 10 is a flowchart illustrating the flow of the data frame transmission process. A transmission process using the CSMA/CA system will be explained as an example.

As illustrated in FIG. 10, upon receiving, from the data frame processing unit 16, an instruction to transmit a data frame, the transmitting unit 12 of the node 10 monitors status of frame transmission around the node 10 based on received signal strength indication (RSSI (received signal strength) (S301 and NO at S302). A monitoring method is the same as employed in the CSMA/CA system, and therefore, detailed explanation thereof will be omitted.

If the RSSI is smaller than a certain value (YES at S302), the transmitting unit 12 of the node 10 waits for a certain time (S303), and thereafter transmits the designated data frame to a destination designated by the data frame processing unit 16 (S304).

Subsequently, the receiving unit 11 of the node 10 waits for an ACK for the data frame transmitted by the transmitting unit 12 (S305). When receiving the ACK (YES at S306), the process is normally terminated.

In contrast, when the receiving unit 11 of the node 10 does not receive the ACK for the data frame transmitted by the transmitting unit 12 (NO at S306), it determines whether a certain time has elapsed (S307). If the certain time has not elapsed (NO at S307), the receiving unit 11 of the node 10 returns to S305 and waits to receive the ACK.

If the receiving unit 11 does not receive the ACK after the lapse of the certain time (YES at S307), the retransmission number control unit 18 of the node 10 determines whether the retransmission processes is performed over the number of times set in the transmitting unit 12 or the like (S308). Incidentally, the retransmission number control unit 18 counts and stores the number of retransmissions in a storage area, such as a memory, in advance.

Subsequently, if the number of the retransmission processes is not over the set number of times (NO at S308), that is, if the number of retransmissions completed by this time is equal to or smaller than the number of retransmissions determined in FIG. 9, the retransmission number control unit 18 outputs, to the transmitting unit 12, an instruction to perform retransmission (S309). Upon receiving the instruction on the retransmission, the transmitting unit 12 returns to S301 and repeat the subsequent process.

In contrast, if the number of the retransmission processes is over the set number of times (YES at S308), that is, if the number of retransmissions completed by this time is greater than the number of retransmissions determined in FIG. 9, the retransmission number control unit 18 outputs, to the transmitting unit 12, an instruction to change the route (S310). Upon receiving the instruction to change the route, the transmitting unit 12 selects a new route by referring to the routing table 10a, and returns to S301 to repeat the subsequent process.

Concrete Example

A concrete example of the retransmission number determination process described in the first embodiment will be explained below. Meanwhile, values or the like described below are mere examples, and are not limited thereto. Furthermore, it is assumed that the weight of link illustrated in FIG. 5 is RSSI, and, 30 and 20 represent −30 dBm and −20dBm, respectively. Moreover, a network configuration is the same as the configuration as illustrated in FIG. 2, and in the following, an example will be described in which the node x determines the number of retransmissions based on the inbound evaluation value.

For example, as a feature of the CSMA/CA system, it is well known that if the number of transmission frames per unit time increases, then packet collision increases and throughput is reduced drastically. It is assumed that the throughput is reduced when a frame corresponding to a bandwidth of one-fourth of 1 Mbps, that is, 250 Kbps, is to be transmitted in the wireless system based on IEEE 802.11b with the communication speed of 1 Mbps. In this case, assuming that the maximum length of a single frame is 1500 bytes, the number of frames when the throughput is reduced is obtained such that 250 Kbps/8 bits/1500 bytes≈21. Therefore, it is assumed that a threshold n for determining whether the number of neighboring nodes is dense or sparse is set to 21. The threshold n of 21 is used, as a threshold for the number of neighboring nodes, to determine the density. Furthermore, the minimum received signal strength is set to −90 dBm, and nodes with the weight of link of 90 (−90 dBm) or greater in the link management table 10b are not counted as the nodes to determine the density.

In this state, the retransmission number control unit 18 of the node x refers to the link management table 10b and counts the number of neighboring nodes. First, the retransmission number control unit 18 looks at the first entry. In FIG. 5, the first entry for the node x in the link management table 10b is the node d. Therefore, the retransmission number control unit 18 of the node x looks at the node d and checks the inbound evaluation value obtained when the node d receives the HELLO frame from the node x. At this time, because the inbound evaluation value is 20 (−20 dBm) and is greater than the minimum reception strength of −90 dBm, the retransmission number control unit 18 counts the node d as a neighboring node (k=1). Subsequently, the retransmission number control unit 18 looks at the node f in a next entry, and counts the node f as a neighboring node (k=2) because the inbound evaluation value is 10 (−10 dBm). Incidentally, because there is no subsequent entry, the retransmission number control unit 18 determines the number of neighboring nodes as k=2.

The number of neighboring nodes (k=2) is smaller than the threshold of 21; therefore, the retransmission number control unit 18 determines that the network is sparse. Because the network is sparse, it is preferable to increase the number of retransmissions. For example, if the initial value of the number of retransmissions is set to four that is a general initial value of a general wireless local area network (LAN), a value equal to or greater than five is set. In contrast, if the number of the neighboring nodes is equal to or greater than 21, the network is dense. In this case, a value equal to or smaller than four is set.

Incidentally, the bit error rate (BER) of consecutive bit sequences stochastically changes based on the received signal strength; therefore, it may be possible to increase or decrease the number of retransmissions by associating the inbound evaluation value and the BER. For example, if the received signal strength is changed by 10 dBm, the BER is changed by one order of magnitude, that is, is increased to ten times or decreased to one-tenth. Therefore, if the number of retransmissions is set to four for the received signal strength of −60 dBm, the BER in the case of −70 dBm is increased to ten times. Therefore, the number of retransmissions to successfully transmit a frame with the same expectation value as that in the case of −60 dBm becomes 40, which is ten times greater than four. However, in reality, the upper limit is usually set to 10, and therefore, the number of retransmissions is set to 10.

Similarly, in the case of −50 dBm, the BER is decreased to one-tenth of the BER in the case of −60 dBm; therefore, the number of retransmissions may be set to one or two. Incidentally, while a system is explained in which the received signal strength is exchanged by exchanging the evaluation value by the HELLO frame between the nodes, the same result may be obtained even when the received signal strength of the subject node with respect to a transmission source node is detected from the receiving unit via a driver.

Advantageous Effect

As described above, each of the nodes determines the number of retransmissions to be performed when frame transmission fails, depending on whether the number of multi-hop network nodes is dense or sparse, and changes the route after the retransmission process fails. Therefore, it becomes possible to control a changeover timing, enabling to ensure the band and stabilize the route at the same time. A concrete example will be explained below with reference to FIG. 11 and FIG. 12.

Figure 11:
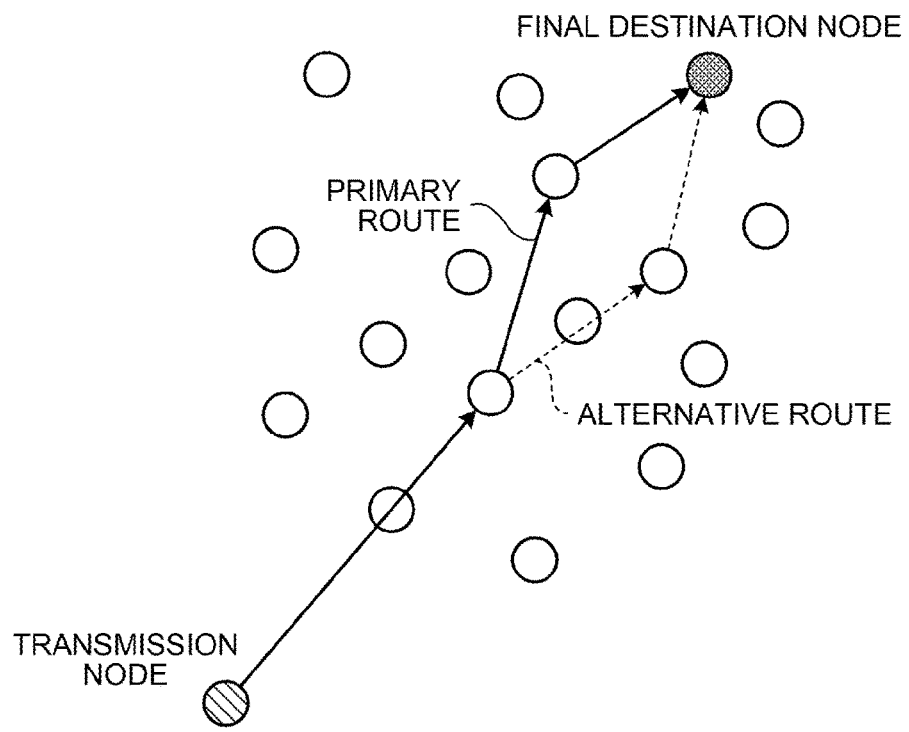
FIG. 11 is a diagram illustrating an example of transmission control when the network is dense.
Figure 12:
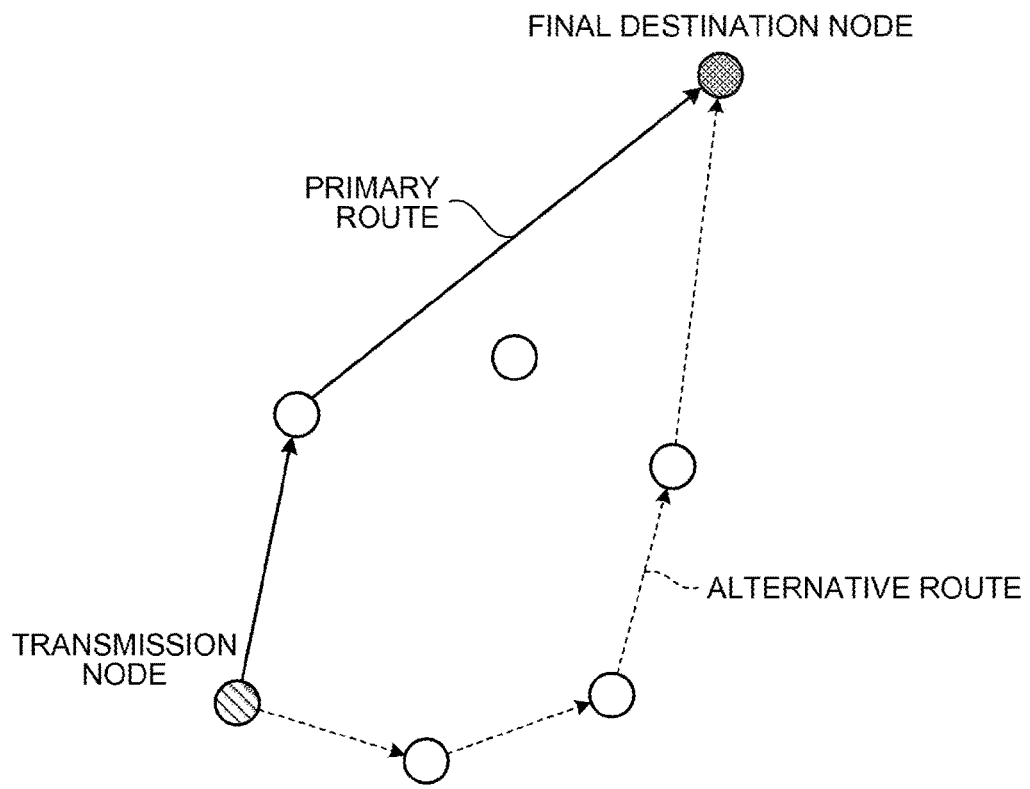
FIG. 12 is a diagram illustrating an example of transmission control when the network is sparse.

FIG. 11 is a diagram illustrating an example of transmission control when the network is dense. FIG. 12 is a diagram illustrating an example of transmission control when the network is sparse. As illustrated in FIG. 11, when the neighboring nodes are densely deployed, the neighboring nodes are greatly influenced by the occupation of the radio band due to the increased number of retransmissions. However, the influence of the total number of hops due to a change in the route is small; therefore, the influence on the frame reachability due to a change in the route without increasing the number of retransmissions is small. In contrast, as illustrated in FIG. 12, when the neighboring nodes are sparsely deployed, the influence of the increased number of retransmissions is small, but the total number of hops is greatly changed due to a change in the route and the frame reachability is greatly influenced by this change.

In view of the above, when the neighboring nodes are densely deployed, because the influence of the occupation of the radio band due to the retransmissions is large but the influence of the change in the route is small, the route is promptly changed when a primary route is disabled. In contrast, when the neighboring nodes are sparsely deployed, the influence of the occupation of the radio band due to the retransmissions is small but the influence of the change in the route is large. Namely, because the number of the nodes is sparse, links in an alternative route may be unstable, while wireless resources are still available. Therefore, the number of retransmissions is increased and the primary route as a highly reliable route is maintained. In this manner, by controlling whether to promptly change the route or to increase the number of retransmissions depending on the density of the number of the nodes in the network, it becomes possible to control, in an associated manner, the processes that have been independently performed by the second layer and the third layer. Therefore, it becomes possible to realize improvement in the frame reachability by increasing the number of retransmissions and ensuring of the radio band at the same time, which have been in a trade-off relationship.

[b] Second Embodiment

While the embodiment of the present invention has been explained above, the present invention may be embodied in various forms other than the embodiment as described above. The other embodiments will be explained below.

Example of Determination of the Number of Nodes

An example has been explained that the node 10 according to the embodiment counts the number of neighboring nodes by referring to the link management table 10b; however, it is not limited thereto. For example, the node 10 may transmit HELLO frames by broadcast and determines the number of responses as the number of neighboring nodes.

Furthermore, an example has been explained that the node 10 according to the embodiment counts the number of nodes with the inbound evaluation values equal to or greater than a predetermined value among the nodes stored in the link management table 10b; however, it is not limited thereto. For example, the node 10 may determine the number of nodes stored in the link management table 10b as the number of nodes, or may count the number of nodes with the weights of link or the outbound evaluation values equal to or greater than a predetermined value.

Moreover, location information may be used. For example, each of the nodes transmits a HELLO frame containing location information on the own node to other nodes. Each of the nodes calculates a distance between the own node and the other nodes based on location information received from the other nodes and the location information on the own node. Subsequently, each of the nodes may count the number of nodes located within a predetermined distance from the own node, and employ the counted value as the number of neighboring nodes. Incidentally, the location information may be measured by providing a GPS to each of the nodes. Furthermore, information on longitude and latitude or coordinates may be used as the location information.

Tables

Information stored in the link management table 10b and the routing table 10a explained in the embodiment is not limited to those illustrated in the drawings. For example, while an example has been explained in the embodiment that the weight of route, the weight of link, the evaluation value, and the like are automatically updated with latest information based on the HELLO frame, it may be possible for an administrator or the like to set or register the information. Namely, each piece of the information may be a variable value or a fixed value.

Furthermore, the method to update the tables explained in the embodiment is not limited to the method as described above. The tables may be updated by using various other known technologies, or may be updated manually by an administrator or the like at regular intervals.

Moreover, while an example has been explained that RSSI is used as the weight of route, the weight of link, and the evaluation value, various indices other than RSSI may be used. For example, it may be possible to use the reception rate of the HELLO frame, an evaluation function, or the like. Furthermore, different indices may be used for the weight of route, the weight of link, and the evaluation value.

Data Format

Furthermore, the HELLO frame and the data frame explained in the embodiment are mere examples, and the formats of frames are not thus limited. Moreover, while a frame is explained as a unit of transmission in the embodiment, it is not limited thereto. For example, data, such as a packet, to be a transmission target may be employed.

Change of Route

For example, although an example has been explained that the node 10 changes the route when it does not receive an ACK after repeating retransmissions the determined number of times, the node 10 repeats the retransmissions after the route is changed. Then, if the node 10 does not receive the ACK after repeating the retransmissions the determined number of times, it further changes the route. In this case, if there is no alternative route to be changed, the node 10 may notify a management terminal or the like of a transmission error, or may repeat the retransmissions by using the primary route again.

System

Of the processes described in the embodiments, all or part of a process described as being performed automatically may also be performed manually. Alternatively, all or part of a process described as being performed manually may also be performed automatically by known methods. In addition, the processing procedures, control procedures, specific names, and information including various types of data and parameters illustrated in the above-described document and drawings may be arbitrarily changed unless otherwise specified.

Furthermore, the components of each unit illustrated in the drawings are only for conceptually illustrating the functions thereof and are not always physically configured as illustrated in the drawings. In other words, specific forms of distribution and integration of the apparatuses are not limited to those illustrated in the drawings. Namely, all or part of the apparatuses may be functionally or physically distributed or integrated in arbitrary units depending on various loads or use conditions. For example, the receiving unit 11 and the transmitting unit 12 may be integrated with each other. Further, for each processing function performed by each apparatus, all or any part of the processing functions may be implemented by a CPU and a program analyzed and executed by the CPU or may be implemented as hardware by wired logic.

Hardware

Figure 13:
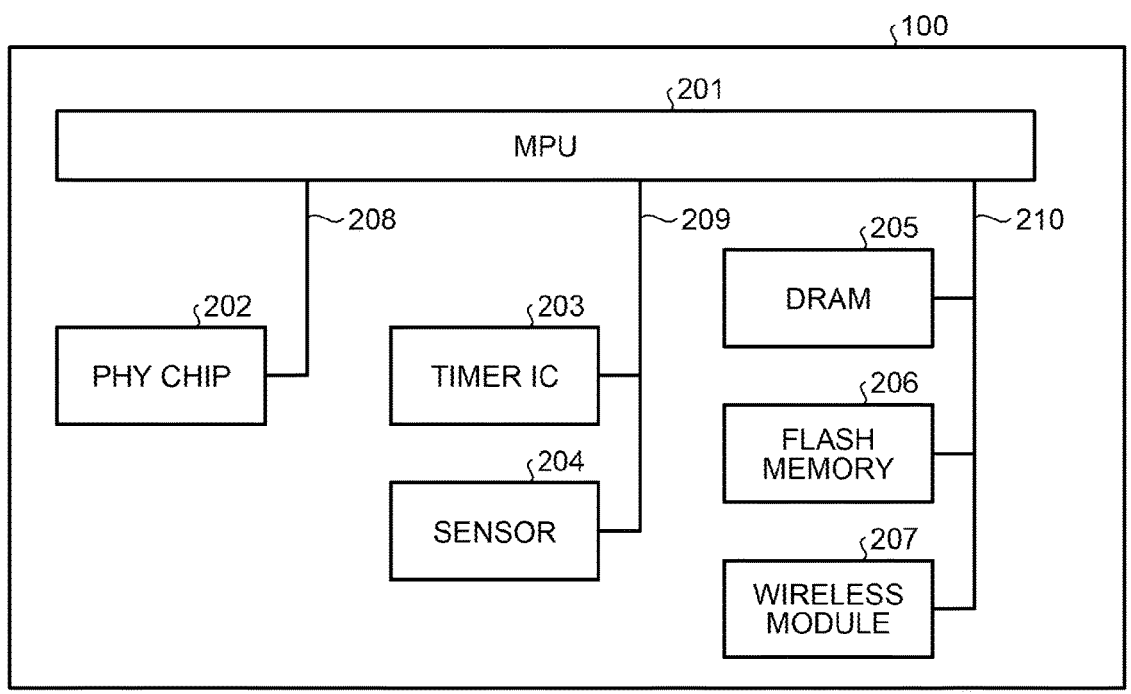
FIG. 13 is a diagram illustrating a hardware example of a computer that executes a transmission control program.

FIG. 13 is a diagram illustrating a hardware example of a computer that implements a transmission control program. As illustrated in FIG. 13, a computer 100 includes a microprocessor unit (MPU) 201, a PHY chip 202, and a timer IC 203. The computer 100 further includes a sensor 204, a dynamic random access memory (DRAM) 205, a flash memory 206, and a wireless module 207.

The MPU 201 and the PHY chip 202 are connected to each other via an interface 208 such as a media independent interface (MII) or a management data input/output (MDIO) interface. The MII and the MDIO interface are interfaces between the physical layer and the media access control sub layer (MAC layer). The MPU 201 and the timer IC 203 are connected to each other and the MPU 201 and the sensor 204 are connected to each other, via a bus 209 such as an inter-integrated circuit (I2C) bus or a parallel input/output (PIO) bus. Furthermore, the MPU 201, the DRAM 205, the flash memory 206, and the wireless module 207 are connected to one another via a peripheral component interconnect (PCI) bus 210. Incidentally, the buses and the interfaces are described by way of example only, and the standards, types, or the like are not limited thereto.

The MPU 201 loads programs stored in the flash memory 206 into the DRAM 205 and executes the programs, to thereby perform various types of processing. For example, the MPU 201 loads the transmission control program stored in the flash memory 206 into the DRAM 205 and executes the transmission control program, to thereby implement the same functions as the processing units explained above with reference to FIG. 3. Specifically, the MPU 201 executes the transmission control program to run a transmission control process to thereby implement the same functions as those of the frame distribution processing unit 13, the table managing unit 14, the HELLO frame processing unit 15, the data frame processing unit 16, the higher-level processing unit 17, and the retransmission number control unit 18. Incidentally, the transmission control program may be stored in a storage medium (not illustrated), such as a hard disk, a magnetic disk, or an optical disk, instead of the flash memory 206.

Furthermore, the DRAM 205 may be used as a buffer for transmitting and receiving a frame. The flash memory 206 stores therein the transmission control program and information stored in the routing table 10a and the link management table 10b illustrated in FIG. 3. Moreover, the flash memory 206 may store therein an identifier or a MAC address assigned to a node.

The PHY chip 202 is a circuit that performs a process in the physical layer in the case of a wired connection. The wireless module 207 is hardware that performs a process in the physical layer in the case of a wireless connection, and implements the same functions as those of the receiving unit 11 and the transmitting unit 12 illustrated in FIG. 3. For example, the wireless module 207 includes an antenna, an analog-to-digital converter (ADC), a digital-to-analog converter (DAC), a modulator, and a demodulator, and transmits and receives data via wireless communication through the processes performed by the above devices. The timer IC 203 performs the same process as that of the clock 19 as illustrated in FIG. 8. For example, the timer IC 203 is a circuit that measures counts until a set time, and when the set time comes, outputs an interrupt signal to the MPU 201. As described above, the computer 100 loads and executes the programs to operate as a wireless communication device that implements the transmission control method.

According to an embodiment of the transmission control method, the node, and the transmission control program of the present invention, it becomes possible to ensure the radio band and stabilize the route at the same time.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission control method executed by a node in an ad hoc network, the transmission control method comprising:
  obtaining, in relation to each of other nodes located in a communication area of the node among nodes in the ad hoc network, a first evaluation value indicating quality of a communication path between the node and the other nodes in the ad hoc network and a second evaluation value indicating quality of a communication path between a destination node and the other nodes in the ad hoc network;
  counting a number of other nodes having the first evaluation value and the second evaluation value which are equal to or greater than a threshold value among the other nodes;
  determining a number of times to retransmit a frame based on both of the counted number of the other nodes and the obtained first evaluation values of each of the communication paths;
  transmitting the frame to the destination node;
  repeating retransmission of the frame the determined number of times until a response to the transmitted frame is received; and
  changing a route to the destination node to another route when the response is not received after repeating the retransmissions the determined number of times.

2. The transmission control method according to claim 1, wherein the counting includes
  transmitting control messages to the other nodes in the ad hoc network; and
  counting number of responses to the control messages.

3. The transmission control method according to claim 1, wherein the counting includes
  receiving, from each of the other nodes in the ad hoc network, a control message including location information on each of the other nodes;
  calculating a distance from the node to each of the other nodes based on the received location information and location information on the node; and
  counting number of nodes for each of which the calculated distance is equal to or smaller than a predetermined value.

4. The transmission control method according to claim 1, wherein the counting includes counting number of neighboring nodes of the node from a link management storage unit in which information on the neighboring nodes is stored.

5. The transmission control method according to claim 4, wherein
  the link management storage unit stores therein the first evaluation value and the second evaluation value, for each of communication paths between the node and the neighboring nodes, and
  the counting includes counting number of nodes for each of which the first evaluation value and the second evaluation value are equal to or greater than a threshold value among the neighboring nodes stored in the link management storage unit.

6. A node comprising:
  a memory; and
  a processor coupled to the memory, wherein the processor executes a process comprising:
  obtaining, in relation to each of other nodes located in a communication area of a node among nodes in an ad hoc network, a first evaluation value indicating quality of a communication path between the node and the other nodes in the ad hoc network and a second evaluation value indicating quality of a communication path between a destination node and the other nodes in the ad hoc network;
  counting a number of other nodes having the first evaluation value and the second evaluation value which are equal to or greater than a threshold value among the other nodes;
  determining a number of times to retransmit a frame based on both of the counted number of the other nodes and the obtained first evaluation values of each of the communication paths;

transmitting the frame to the destination node;

repeating retransmission of the frame the determined number of times until receiving a response to the transmitted frame; and changing a route to the destination node to another route when the response is not received after repeating the retransmissions the determined number of times.

7. The node according to claim 6, wherein the counting includes, transmitting control messages to the other nodes in the ad hoc network; and counting number of responses to the control messages.

8. The node according to claim 6, wherein the counting unit includes, receiving, from each of the other nodes in the ad hoc network, a control message including location information on each of the other nodes;

calculating a distance from the node to each of the other nodes based on the received location information and location information on the node; and counting number of nodes for each of which the calculated distance is equal to or smaller than a predetermined value.

9. The node according to claim 6, wherein the memory stores information on neighboring nodes of the node, and the counting includes counting number of the neighboring nodes by referring to the memory.

10. The node according to claim 9, wherein the memory stores therein the first evaluation value and the second evaluation value, for each of communication paths between the node and the neighboring nodes, and the counting includes counting number of nodes for each of which the first evaluation value and the second evaluation value are equal to or greater than a threshold value among the neighboring nodes stored in the memory.

11. A non-transitory computer-readable recording medium having stored therein a control program causing a computer included in an ad hoc network to execute a process comprising:

obtaining, in relation to each of other nodes located in a communication area of a node among nodes in the ad hoc network, a first evaluation value indicating quality of a communication path between the node and the other nodes in the ad hoc network and a second evaluation value indicating quality of a communication path between a destination node and the other nodes in the ad hoc network;

counting a number of other nodes having the first evaluation value and the second evaluation value which are equal to or greater than a threshold value among the other nodes;

determining a number of times to retransmit a frame based on both of the counted number of the other nodes and the first obtained evaluation values of each of the communication paths;

transmitting the frame to the destination node;

repeating retransmission of the frame the determined number of times until a response to the transmitted frame is received; and changing a route to the destination node to another route when the response is not received after repeating the retransmissions the determined number of times.

12. The non-transitory computer-readable recording medium according to claim 11, wherein the counting includes transmitting control messages to the other nodes in the ad hoc network; and counting number of responses to the control messages.

13. The non-transitory computer-readable recording medium according to claim 11, wherein the counting includes receiving, from each of the other nodes in the ad hoc network, a control message including location information on each of the other nodes;

calculating a distance from the computer to each of the other nodes based on the received location information and location information on the computer; and counting number of nodes for each of which the calculated distance is equal to or smaller than a predetermined value.

14. The non-transitory computer-readable recording medium according to claim 11, wherein the counting includes counting number of neighboring nodes of the computer from a link management storage unit in which information on the neighboring nodes is stored.

15. The non-transitory computer-readable recording medium according to claim 14, wherein the link management storage unit stores therein the first evaluation value and the second evaluation value, for each of communication paths between the computer and the neighboring nodes, and the counting includes counting number of nodes for each of which the first evaluation value and the second evaluation value are equal to or greater than a threshold value among the neighboring nodes stored in the link management storage unit.

* * * * *